Figure 3:
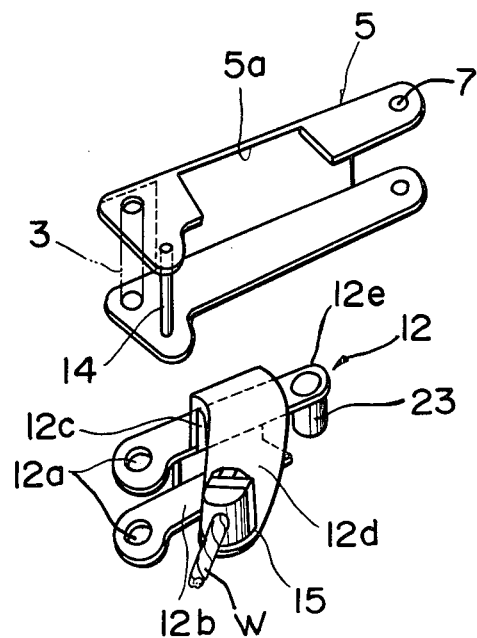

United States Patent [19]

Nagano et al.

[11] 4,106,356
[45] Aug. 15, 1978

[54] DERAILER FOR A BICYCLE

[75] Inventors: Masashi Nagano; Hideaki Fujimoto, both of Sakai, Japan

[73] Assignee: Shimano Industrial Company Limited, Osaka, Japan

[21] Appl. No.: 737,670

[22] Filed: Nov. 1, 1976

[30] Foreign Application Priority Data

Jan. 12, 1976 [JP] Japan .................................. 51/3005

[51] Int. Cl.² .......................................... F16H 11/04
[52] U.S. Cl. ................................................. 74/217 B
[58] Field of Search ............................ 74/217 B, 242

[56] References Cited

U.S. PATENT DOCUMENTS

| | | | |
|---|---|---|---|
| 3,535,950 | 10/1970 | Shimano et al. | 74/473 |
| 3,890,847 | 6/1975 | Dian | 74/217 B |
| 3,896,679 | 7/1975 | Huret et al. | 74/217 B |
| 3,903,751 | 9/1975 | Dian | 74/217 B |
| 3,974,707 | 8/1976 | Nagano | 74/217 B |
| 3,979,962 | 9/1976 | Kebsch | 74/217 B |
| 4,027,542 | 6/1977 | Nagano | 74/217 B |
| 4,030,375 | 6/1977 | Nagano | 74/217 B |

Primary Examiner—Benjamin W. Wyche
Assistant Examiner—Wesley S. Ratliff, Jr.
Attorney, Agent, or Firm—Stevens, Davis, Miller & Mosher

[57] ABSTRACT

A derailer for a bicycle, comprising a fitting member, a movable member, and a connecting member for movably connecting the movable member with the fitting member, at least one control member swingable independently of the movable member, a spring energized by the swing of the control member, and a positioning device provided between the control member and one of the fitting member, movable member and connecting member and serving to positionally set a chain guide on the movable member with respect to one of a plurality of sprockets, so that the speed-changing stage previously desired may be selected when the pedals stop rotating regardless of whether the bicycle is at a standstill or coasting.

25 Claims, 24 Drawing Figures

Fig. 1

Fig. 2

DERAILER FOR A BICYCLE

This invention relates to a derailleur for a bicycle and more particularly to a derailleur which is used together with a multistage freewheel. The freewheel usually comprises three or five sprockets mounted on a rear hub of the bicycle, so that a driving chain (called hereinafter referred to as a chain) may be selectively shifted from one sprocket to another sprocket of the freewheel.

Conventionally, this type of derailleur, which includes the so-called link and rod type, is composed of a fitting member mounted to the bicycle frame, a movable member carrying a chain guide means, and a connecting member for connecting the movable member with the fitting member so that the movable member may be swingable by a pulling operation of a control wire for shifting the chain from one sprocket to another sprocket at the desired speed changing stage.

There are is a known method for allowing the movable member to swing, such that a return spring urges the movable member unidirectionally. Thus the movable member is shiftable in one direction by a pull of the control wire, while shiftable, in the other direction by restoration of the return spring. Two control wires are used, one of which is pulled to shift the movable member in one direction and the other is pulled to shift the same in the reverse direction.

The well-known derailleur of any type, which is operable through the control wire operated by a control lever provided on or near to the handle bar of the bicycle, has no mechanism such that the movable member, that is, the chain guide means, is positionally defined with respect to the multistage freewheel. Accordingly, there have been problems in that a cyclist cannot determine the position by feel only which results in inaccurate shifting of the chain. It is absolutely impossible for the chain to be shifted unless it is made to travel across a front gear and the freewheel attached to the rear wheel of the bicycle.

U.S. Pat. No. 3,974,707 provides a derailleur with a positioning means for setting the chain guide means so as to be properly positioned with respect to each of the sprockets respectively and thereby always accurately shifting the chain when changing the bicycle speed.

The derailleur of the previous invention could accurately change the bicycle speed when pedalling but could not solve the problem of changing the bicycle speed when pedalling was stopped or the bicycle halted.

The invention has been designed in view of the abovementioned problems. It is therefore an object of the invention to provide a derailleur by which the chain can always be shifted accurately and the bicycle speed changed to a desired speed changing stage even in the absence of the chain movement and regardless of the running or stopping of the bicycle.

In greater detail, the derailleur of the invention in addition to the aforesaid three members, is provided with at least one control member movable independently from the movable member of among the three. To the control member is attached the control wire or an outer cable to guide the wire so that the movable member may be shiftable through the control member. A spring is provided at the control member so as to urge the movable member in its shifting direction, and a positioning device is provided between the control member and one of the three members or between control members. Thus, the derailleur is adapted to allow the control member to move against the spring when the movable member is subject to resistance against shifting in changing speed so that energy may be stored in the spring, while, the spring can, when the resistance disappears, restore the movable member to its definite position corresponding to the desired speed changing stage as a result of the stored energy. In other words, the derailleur is capable of changing the bicycle speed while the bicycle is at a standstill and when pedalling has stopped even though moving. Further, the derailleur is operable for accurately selectively changing to a desired changing stage.

Figure 4:
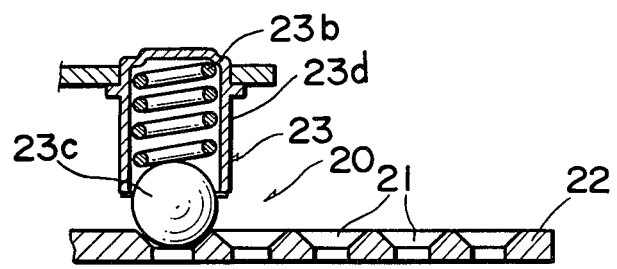
Figure 6:
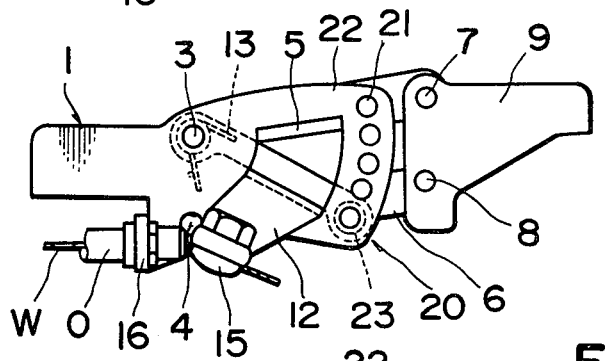
Figure 7:
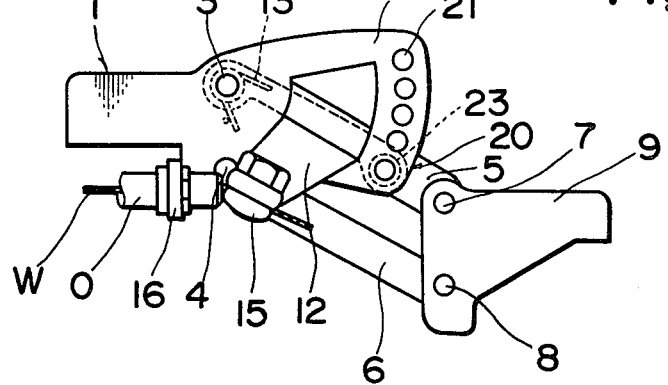
Figure 8:
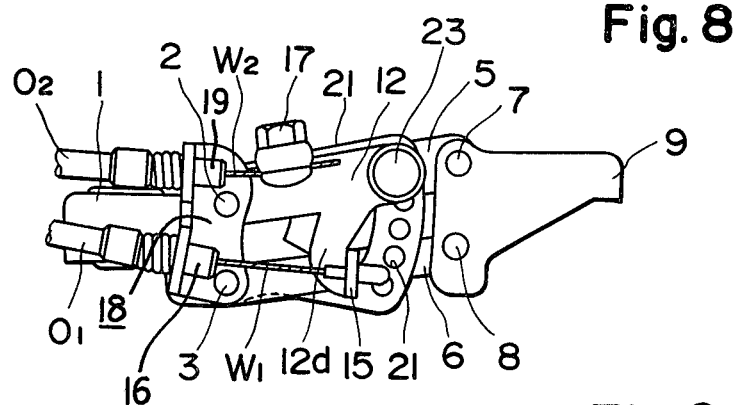
Figure 9:
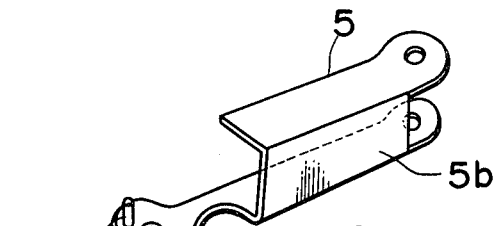
Figure 10:
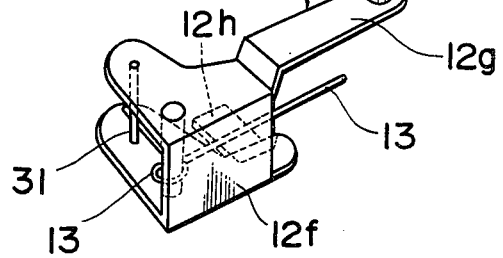
Figure 11:
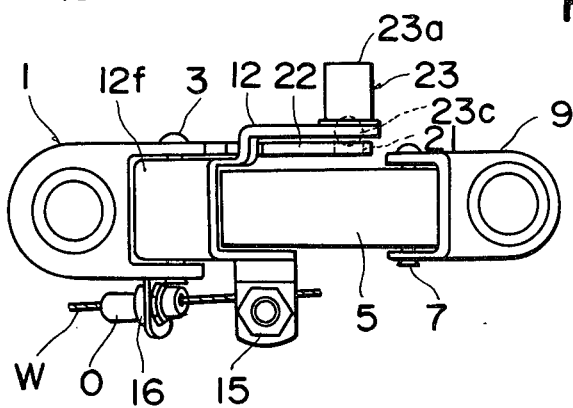
Figure 12:
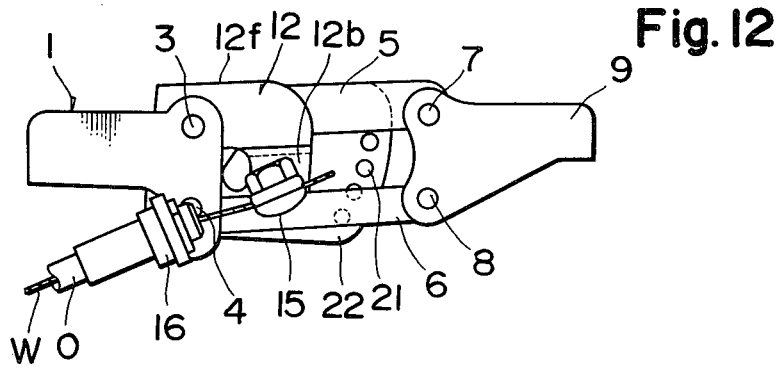
Figure 13:
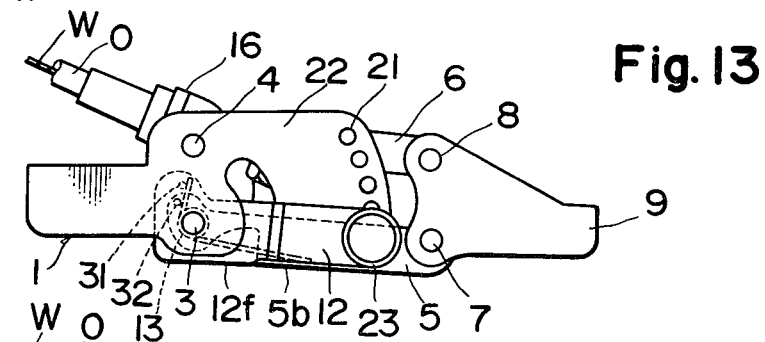
Figure 14:
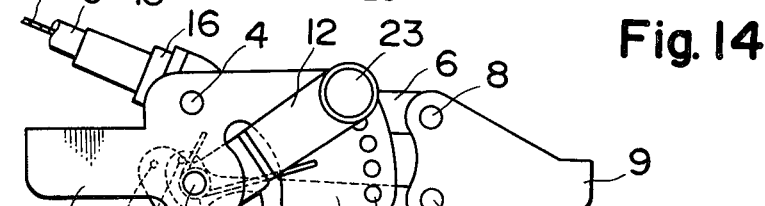
Figure 15:
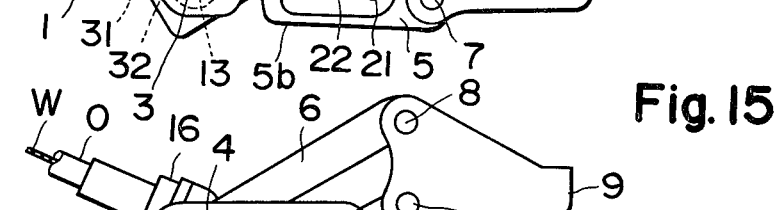
Figure 16:
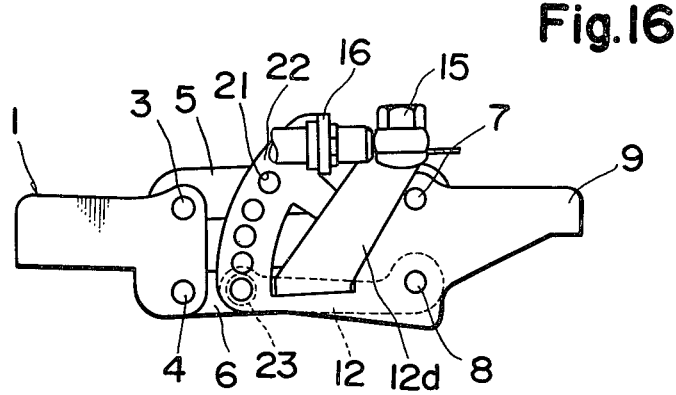
Figure 17:
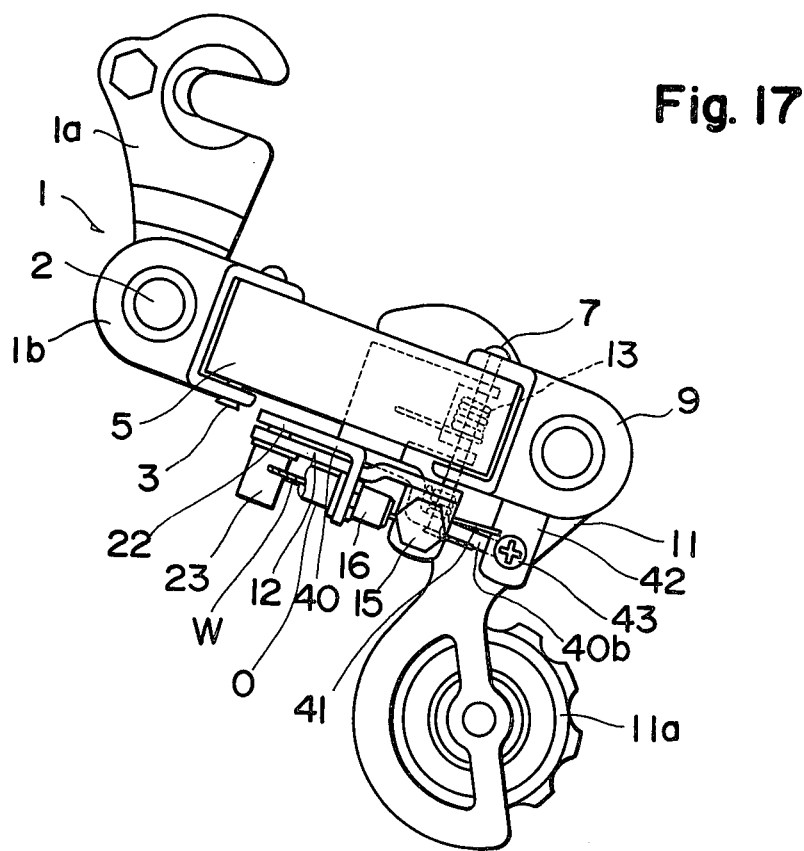
Figure 20:
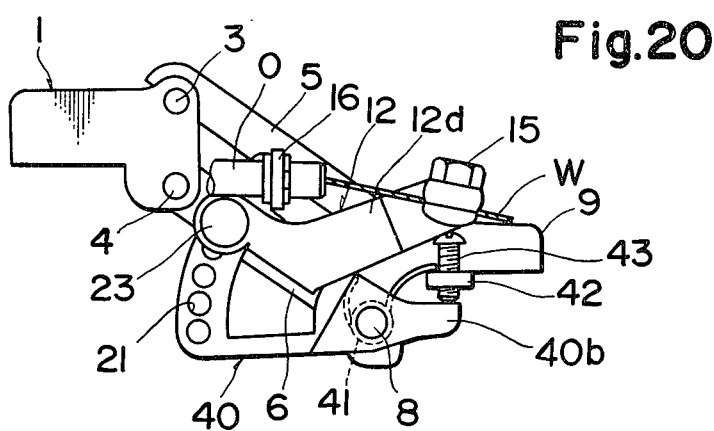
Figure 21:
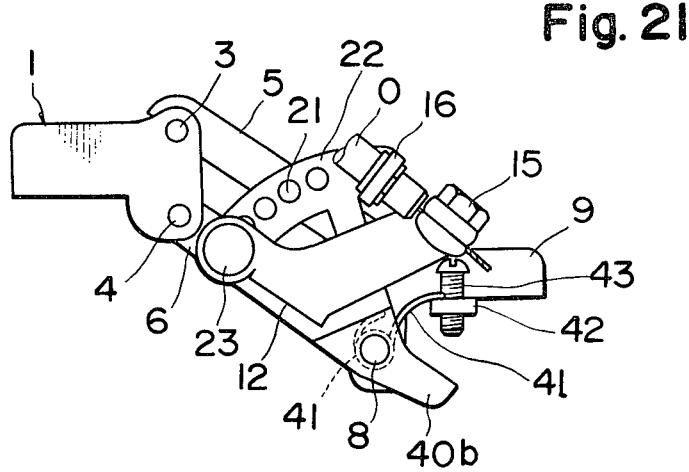
Figure 22:
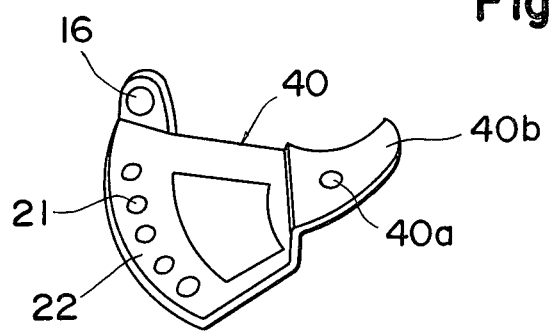
Figure 23:
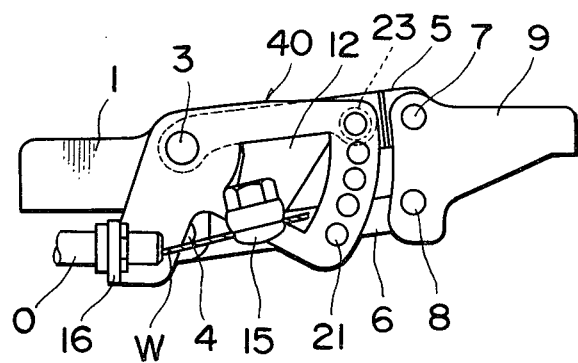
Figure 24:
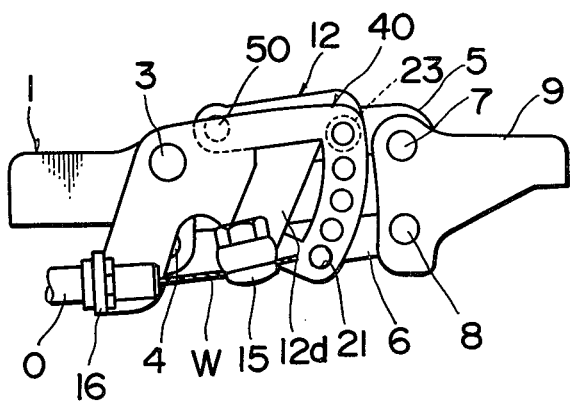

These and other objects, features and advantages of the invention will become more apparent upon referring to the following detailed description and drawing, in which:

FIG. 1 shows a front view of a first embodiment of the derailleur of the invention, FIG. 2 shows a plan view of the derailleur of FIG. 1, FIG. 3 shows a perspective view showing linkage members and a control member of the derailleur of FIG. 1, FIG. 4 shows an enlarged sectional view of a positioning device of the derailleur of FIG. 1, FIGS. 5 through 7 are partially omitted bottom plan views showing the function of the derailleur of FIG. 1, FIG. 8 shows a partially omitted bottom plan view of a second embodiment of the invention, FIG. 9 shows a perspective view of one linkage member of a third embodiment of the invention, FIG. 10 shows a perspective view of a control member of the third embodiment of the invention, FIG. 11 shows a partially omitted front view of the third embodiment of the invention, FIG. 12 shows a partially omitted bottom plan view of the third embodiment of the invention, FIGS. 13 through 15 are partially omitted plan views showing the function of the third embodiment of the invention, FIGS. 16 shows a partially omitted bottom plan view showing a fourth embodiment of the invention, FIG. 17 shows a front view of a fifth embodiment of the invention, FIGS. 18 through 21 are partially omitted bottom plan views showing the function of the derailleur of the fifth embodiment of the invention, FIG. 22 is a perspective view of a control member thereof looking from its bottom, and FIGS. 23 and 24 are partially omitted bottom plan views showing a sixth embodiment of the invention.

Referring to the drawings, the derailleurs of the invention are of the link type, which as shown in FIGS. 1 and 2, are principally constructed to have three members: a fitting member 1, two parallel linkage members 5 and 6, and a movable member 9. The fitting member 1 is composed of a bracket member 1a fixed together with a hub shaft (not shown) to a fork end (not shown) of the bicycle frame and of a fitting body 1b mounted to the bracket member 1a in a rotatable relationship within a given range through a pivot 2. The fitting body 1b is rotatable with respect to the bracket member 1a but rigid with respect to the movable direction of the movable member 9.

Also, the fitting body 1b is pivotally connected at one side with both opposite ends of linkage members 5 and 6 through pins 3 and 4.

Linkage members 5 and 6 are equal in length, formed in substantially C-like sections, and arranged at the open ends thereof to be opposite to each other. At the fore end of each linkage members 5 and 6 is pivoted the movable member 9 through two pins 7 and 8.

The movable member 9 is formed substantially similarly to the fitting body 1b, at one side of which are supported a pivotal end for each linkage member 5 and 6 through pins 7 and 8 in a swingable relation with respect to the linkage members respectively. While at the other side there is pivoted through a pivot 10 extending in the same direction as the pivot 2 a chain guide means 11 having two chain guide pulleys 11a in a rotatable relation only in a given range.

To slip guide pulleys 11a is trained a driving chain (not shown) which is guided to the desired sprocket of the multistage freewheel (not shown) through the pulleys. The guide pulleys 11a are shifted axially of the multistage freewheel to allow the chain to mesh with the desired sprocket thereby changing the bicycle speed.

The aforesaid principal construction of the derailleur, which is quite similar to that of a well known derailleur, will be fully understandable from the above description.

Figure 5:
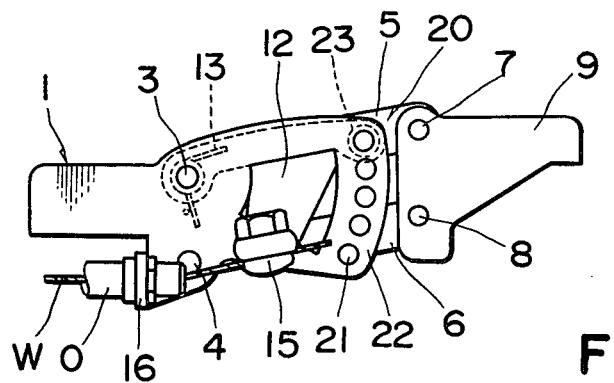

The derailleur of the invention, which is principally constructed as aforesaid, is provided with one or more control members 12 movable independently of movable member 9, to which control member 12 is provided a spring 13 for urging the movable member 9 in the direction of its shifting as shown in FIGS. 5 through 7, and a positioning device 20 formed between the control member 12 and one of the fitting member 1, the linkage member 5 or 6, and the movable member 9, so that when movable member 9 is subject to a resistance generated against the speed-changing when chain travel has stopped or to a larger resistance than normal such as in travelling of the chain, the control member 12 may be shifted against the spring 13. Thereafter, when the larger resistance disappears upon a starting of the chain travel, the spring 13 may be restored to shift the movable member 9 toward the desired speed changing stage by means of the positioning device 20.

The control member 12, as shown in FIG. 3, is formed of a link 12b having at one end bores 12a for receiving a pivot therethrough. The link 12b has an arm 12d extending from an up-right portion 12c projected from a widthwise portion of one end of a side of the link 12b. At the other end of link 12b is an extension 12e carrying therewith either a holder or a retainer, of the positioning device 20 to be hereinafter detailed. The arm 12d supports at its tip a control wire W or ann outer cable 0 for guiding the wire.

The positioning device 20, as shown in FIG. 4, serves to define the positioning of movable member 9 corresponding to each of the speed changing stages, and at the same time, keep the chain guide pulleys 11a of the movable member 9 in the shifted positions. Positioning device 20 comprises a holder 22 having a number of recesses 21 corresponding to the number of speed changing stages and a retainer 23 insertably engageable with each of the recesses 21.

In addition, the control member 12 may, other than supported to the fitting member 1 as shown in FIGS. 1, 2 and 5 through 7, be supported on the movable member 9 as shown in FIG. 16, and further to one of the linkage members 5 and 6. The holder 22 of the positioning device 20 may be formed at the control member 12 or at one of the fitting member, movable member or connecting member as shown in the drawings. The retainer 23 cooperating with holder 22 is supported to the member opposite to that carrying the holder 22, that is, one of the aforementioned three members when the control member 12 carries the holder 22, or the control member 12 when the holder 22 is carried by one of the three members.

Various arrangements of components of the derailleur may be made as described aforesaid. The derailleur of the invention will be described in detail by referring to FIGS. 1 through 7, in which control member 12 is supported by fitting member 1, the holder 22 of the positioning device 20 is mounted on fitting member 1, and the retainer 23 is mounted on control member 12.

Control member 12 in this arrangement, which is formed as shown in FIG. 3, is located inside the linkage member 5 so that arm 12d may be directed toward the other linkage member 6, and is pivoted to linkage member 5 through pin 3. Additionally, linkage member 5 is, as shown in FIG. 3, cut out at 5a so that the upright portion 12c may project outwardly from the inside of linkage member 5 without hindrance. At one end of linkage member 5 is fixed a rod 14 for retaining one end of the spring 13. At the outermost portion of the arm 12d there is mounted a wire holder 15 for retaining a terminal of the control wire W. At fitting member 1 there is provided a cable holder 16 for retaining a terminal of outer cable 0, where control wire W employs a push-pull type wire and both the wire and cable may be alternative of their retained positions as the aforesaid.

Spring 13 coiled around pin 3 is seated at one end rod 14 and at the other end to the inner surface of the wall connecting therewith the two opposite walls of the link of control member 12. The function of spring 13 is that when control wire W is pulled to allow control member 12 to swing around pin 3, linkage member 5 and control member 12 cooperable through the spring 13 inserted therebetween can swing together to shift the movable member 9 through the former in case greater resistance is not applied to the linkage member 5 against its shifting. No resistance larger than normal is applied to the movable member against its shifting because the chain is travelling. On the other hand, linkage member 5 does not swing but only control member 12 swings in case greater resistance is applied to the movable member against its shifting due to the chain not travelling so that the spring 13 is deflected by the shift of only control member 12 so as to be energized. Furthermore, the stored energy in the spring 13 is, upon disappearance of the greater resistance, applied to linkage member 5 to be swung so that movable member 9 may be shifted axially of the sprockets through linkage member 5.

Next, the positioning device 20 will be described by the following, which sets the shifted position of control member 12 and holds it as well.

Holder 22 of positioning device 20 is formed integrally with an extension from one end of fitting member 1 toward the movable member 9. Besides this, it may be formed of a separate member to be fixed to fitting member 1. Holder 22 extends at one end toward a side of movable member 9 to reach substantially the fore ends of the linkage members 5 and 6. The end closest to movable member 9 is provided with the recesses 21. Recesses 21, which are mainly formed as holes as shown in FIG. 4, are arranged along the line of movement of retainer 23 at control member 12 and regularly spaced correspondingly to the movement of the retainer between the speed changing stages. When the recesses 21 are formed of holes, they are opened at one side thereof in dish-like shapes respectively so that adjacent recesses may be mountain-shaped therebetween. Thus, retainer 23 located at the slope of the mountain-shaped portion between the adjacent recesses is allowed to slip into any one of recesses 21.

The retainer 23 engageable with each of the recesses 21, as shown in FIG. 1, is mounted on control member 1 and comprises a cylinder 23a, a coiled spring 23b, and a ball 23c inserted into the cylinder 23a and tending to come out therefrom through the spring 23b. Ball 23c is made engageable with any one of the recesses 21 as shown in FIG. 4. Since ball 23c can be kept in engagement with each of the recesses 21 by means of the tension of the coiled spring 23b it always is outwardly biasing the ball 23c. The tension of spring 23b, that is, the force of engagement of the ball 23c with the recess, should be made larger than the energy stored in the spring 13. Accordingly, the engagement of ball 23c with any one of the recesses 21 allows the movable member to be accurately shifted to the desired speed changing stage and also to be kept in it exactly. Furthermore, it is possible that the control member 12 is shiftable to the set position corresponding to the desired speed changing stage even when only the control member is shifted due to the chain not travelling and that the stored energy in spring 13 allows movable member 9 to be axially moved to the desired speed changing stage in coincidence with the set position and to be kept in the stage as well. In other words, the so-called pre-selection can be carried out which even when the chain is stopped.

In addition, it is necessary for positioning device 20 to be made so that chain guide pulleys 11a may positionally correspond to each of sprockets of the freewheel when ball 23c is engaged with each of the recesses 21.

Now, the function of the derailleur constructed as in the aforegoing will be described in detail in relation to FIGS. 5 through 7.

Control wire W is secured at its terminal to a control lever (not shown) provided at or near the handle bar of the bicycle so as to be pushed or pulled for swinging the movable member 9 through the control member 12.

The movable member 9 shown in FIG. 5 is positioned at the high speed stage and shiftable to the low as shown in FIG. 7 by a pull of the control wire W and then restorable therefrom to the high by a push of the same.

For convenience of the explanation, the shifting of the movable member 9 from the high speed stage to the low is represented by the forward motion and the reverse is done by the backward motion.

When the control lever is operated in reciprocation during the chain travel, i.e., forcibly pedalling, the linkage member 5 swings together with the control member 12 so that the movable member 9 may be reciprocated resulting in shifting the chain to the desired speed changing stage i.e., the same as in the conventional derailleur. In this chain-shifting, the engagement of the retainer 23 with one of the recesses 21 makes it possible to position the movable member 9, in turn, the chain guide means 11, properly to the desired sprocket and keep it in the proper position as well.

On the contrary, when the chain is not travelling due to not pedalling while the bicycle is running or while the bicycle is at a standstill, the control wire pulled by operating the control lever tries to move linkage member 5 but movable member 9 is restricted from its shifting due to the stopped chain which results in the application of great resistance to the movable member against its shifting. Therefore, the linkage member cannot move. Only control member 12 swings to reach the desired speed changing stage as shown in FIG. 6.

Next, when the chain starts to travel by pedalling, the aforesaid resistance disappears and the linkage members 5 and 6 are made swingable by the stored energy in spring 13 deflected by the aforesaid movement of the control member 12, thereby moving forward movable member 9 as shown in FIG. 7. The forward movement of movable member 9 is not free but restricted to the predetermined speed changing stage and thereafter is kept in the position corresponding to the speed changing stage.

In case the push-pull type control wire is employed in the aforesaid embodiment, two control wires $W_1$ and $W_2$ are available as in the second embodiment shown in FIG. 8, in which the one control wire $W_1$ is secured at its one end to the wire holder 15 provided at the arm 12d of the control member 12 and the other wire $W_2$ to a wire holder 17 provided at substantially the middle portion of the linkage member 5. The outer cables $0_1$ and $0_2$ corresponding to wires $W_1$ and $W_2$ respectively, are secured to cable holders 16 and 19 mounted on a support 18 formed at the fitting member 1.

Now, the third embodiment of the invention will be described in detail with reference to FIGS. 9 through 15, which is directed to having one control member 12 preselectable in both backward and forward movements of the movable member 9 although the aforesaid first and second embodiments have the so-called preselecting mechanism such that the control member 12 is shiftable only at the forward movement of the movable member 9 so as to deflect the spring 13 to be energized and then the movable member 9 is shifted to the pre-set position by the control member 12 after the resistance disappears.

The derailleur of the third embodiment is provided with linkage member which carries control member 12 therewith and is formed as shown in FIG. 9 so that control member 12 may be made movable in the normal and reverse directions, i.e., both the inward and outward directions with respect to linkage member 5, and with control member 12 formed as shown in FIG. 10 and pivoted to linkage member 5 through the pin 3 which pivotally supports the linkage member to fitting member 1. Around pin 3 is coiled spring 13 one end of which is seated against rod 31 which is provided at control member 12 to rectangularly connect both opposite walls thereof and the other end of which is seated against the inner surface of vertical wall 5b which connects both the opposite side walls of the linkage member 5.

In addition, linkage member 5 pivoting around pin 3 is provided at its base with rod 32 which is upright from the base and serves in place of rod 31 at control member 12 for seating one end of the spring 13 thereto, while, the control member 12 is provided with a vertical wall 12f serving in place of the vertical wall 5b at the linkage member 5 for seating the other end of the spring 13 thereto.

The control member 12 as shown in FIG. 10, is formed at its base in a substantially C-like shape composed of the vertical wall 12f and two opposite side walls connected therewith. The base is provided with a support arm 12g which extends lengthwise of the base from one of the two opposite side walls and carriers the retainer 23 of the positioning device 20 and with a nose 12h which is protrudent from the other wall rectangularly of the support arm 12g and carries the wire holder 15 fixing the terminal of the control wire W as shown in FIG. 12.

Additionally, in the third embodiment, the holder 22 of the positioning device 20 is formed as an extension of fitting member 1 and provided at substantially the intermediate portion with a cutout through which the control member 12 is movable without a hitch.

The preselectable operation of the derailleur constructed as aforesaid in the forward and backward movements of the movable member 9, will be described in detail hereinafter.

The movable member 9 shown in FIG. 13 is positioned at the high speed stage and shiftable therefrom to the low by pulling to the control wire W. When the movable member 9 is subject to excessive resistance against shifting only control member 12 swings as shown in FIG. 14 which displaces rod 31 so that the one end of spring 13 is changed to be seated against rod 32 at linkage member 5 and the other end is seated against vertical wall 12f of control member 12 in place of wall 5b of linkage member 5 thereby deflecting spring 13 to be energized. The energy allows the linkage member 5 to swing upon disappearance of the excessive resistance, thereby shifting movable member 9 to be positioned at the low speed stage. Conversely, when control wire W is pushed to shift movable member 9 from the low speed stage to the high, an excessive resistance applied to the movable member against its shifting allows control member 12 only to move and also rod 31 moves following the shifting of the control member so as to push one end of spring 13, at the same time, vertical wall 5b of linkage member 5 remains to keep the other end seated thereto, whereby spring 13 is deflected to be energized. Upon disappearance of the excessive resistance the stored energy in spring 13 allows linkage member 5 to move toward control member 12 thereby shifting the movable member 9 to the high speed stage.

In the third embodiment, instead of being mounted to the fitting member 1 by use of pivot pin 3 for linkage member 5, control member 12 as shown in FIG. 16, may be mounted to movable member 9 by means of pin 8 for connecting movable member 9 with linkage member 6, or to pin which attachment is not shown, where holder 22 of the positioning device 20 is provided at movable member 9. When control member 12 is mounted to either one of linkage members 5 and 6, another pin (not shown) is available, where holder 22 is provided at fitting member 1 or movable member 9, to meet location of the control member 12. Incidentally, holder 22, which is described of its location as aforesaid, may be provided at either control member 12 or one of the three members corresponding thereto, that is, if holder 22 is provided at control member 12, the abovementioned holder 22 should be replaced by retainer 23.

Hereinafter, the fifth and sixth embodiments of the invention will be described in detail by reference to FIGS. 17 through 24.

The fifth and sixth embodiments are principally structurally similar to the first through fourth embodiments, but differ in that first and second members are provided to have the positioning device 20 insertably/control mounted between the two control members opposite to each other. For the convenience of illustration, the aforesaid control member 12 is hereinafter called the first control member and a newly added control member is the second one.

The derailleur employing the two control members is shown in FIGS. 17 through 24, in which reference numeral 40 designates the second control member added separately from the first control member 12. The second control member 40 has a second spring 41 which is the same as a first spring 13 provided at the first control member 12, and also holds either a control wire W or an outer cable 0.

In these embodiments the two control members 12 and 40 may be mounted to fitting member 1 as shown in FIGS. 17 through 22, to movable member 9 in FIG. 23, or to one of the linkage members 5 and 6, where FIG. 24 shows the mounting to the linkage member 5. Holder 22 and retainer 23 of the positioning device 20 may similarly be provided at one of the two control members and at the other respectively. Also, control wire W is similarly secured to one of the two control members 12 and 40 and outer cable 0 to the other. Incidentally, embodiments are available wherein two control wires other than the push-pull type wire are secured at one end thereof to the two control members 12 and 40 respectively.

The fifth embodiment among these two will be described in detail in relation to FIGS. 17 through 22, which is so arranged that movable member 9 carries therewith first and second control members 12 and 40, first control member 12 carries holder 22 of positioning device 20 and the second one 40 carries retainer 23, and control wire W of push-pull type is secured to first control member 12 and outer cable 0 to the second one 40.

First control member 12 in this fifth embodiment is formed in the same way as that shown in FIG. 3, that is, the tip of the arm 12d is secured to control wire W through wire holder 15 and to support projection 12e is mounted retainer 23. The second control member 40 as shown in FIG. 22, is formed of a plate member, which has a base perforated with a bore 40a for receiving therein a pivot pin and a fore end which is provided with a plurality of recesses 21 arranged inwardly of and along a curved fore edge and with a holder 16 bent from one side edge of the fore end, holder 16 securing therewith the terminal of outer cable 0.

Recesses 21 at control member 40, which build up positioning device 20 in company with retainer 23, are regularly spaced along the line of the movement of retainer 23, in coincidence with the extent of shifting thereof corresponding to each of the aforesaid speed changing stages, control member 40 serving as the holder 22 of positioning device 20.

The aforesaid first control member 12 is positioned inside linkage member 6 so that arm 12d may be directed to linkage member 5, and is pivotally supported to linkage member 6 through pin 8, and the second control member 40 is positioned outside linkage member 6 to be pivoted thereto through an external extension of pin 8. Both first and second control members 12 and 40 swing around pin 8, but the former is restricted from its further movement by the wall of linkage member 6 and the second control member 40 is similarly restricted by nose 40b extending from the vertical base of the same and contacting stopper 42 formed at movable member 9. Thus, both the members in FIG. 18, made shiftable clockwise around pin 8.

Figure 18:
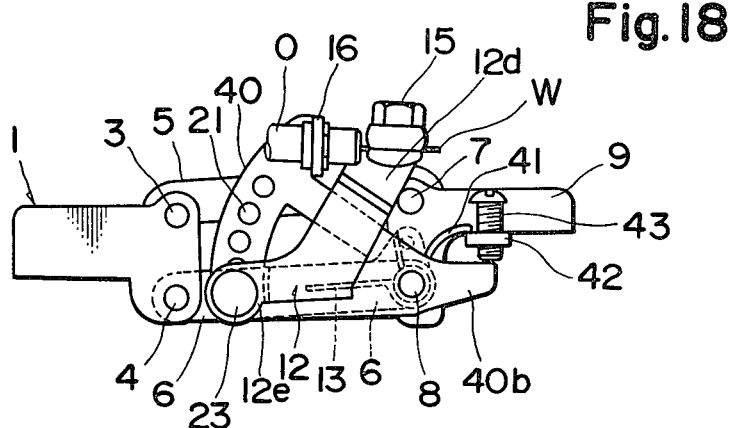

The derailleur of the fifth embodiment constructed as aforesaid, can also make movable member 9 swingable by pushing or pulling the control wire, that is, movable member 9 is shiftable from the high speed stage shown in FIG. 18 to the low speed stage shown in FIG. 21 by pushing the wire and is reversed by pulling the wire.

In this instance, when the wire is pushed or pulled during the chain's travelling, linkage member 6 moves together with the first control member 12 so as to swing movable member 9. Thus the chain may be shifted to the desired speed changing stage like the shift in the conventional derailleur and the engagement of retainer 23 with one of recesses 21 enables movable member 9, i. e.) chain guide means 11, to be properly located with respect to a desired sprocket of the freewheel and kept in its location.

Figure 19:
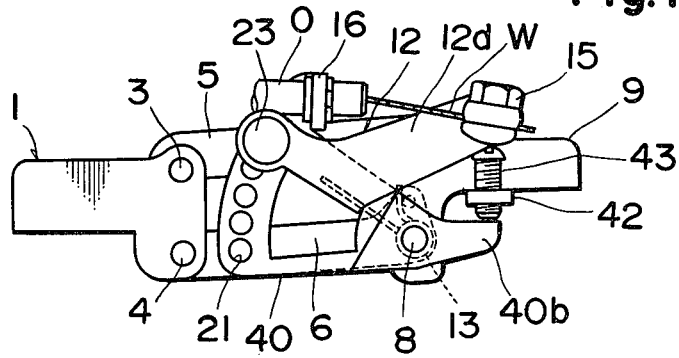

On the other hand, when control wire W is pushed by operating the control lever when the chain is not travelling linkage member 6 tries to move together with the first control member, but the former is not moved and only the latter is movable as shown in FIG. 19 because movable member 9 is restricted from its shifting by the stop of the chain so as to be subject to greater resistance against the shifting. First control member 12 is moved by operating the control wire so as to reach the position corresponding to the desired speed changing stage, thereby deflecting first spring 13 to be energized.

The energy stored in first spring 13 is, when the resistance disappears after the chain starts to travel, applied to linkage members 5 and 6 to be shifted, so that the movable member 9 as shown in FIG. 20, may be forwardly moved to the preset changing stage, i.e., the low speed stage.

Next, when the chain is at rest, the control wire pulled to change the bicycle speed from low to high tries to move first control member 12. First control member 12, however, is restricted from its movement due to its contact with linkage member 6, whereby second control member 40 carrying the holder 16 for outer cable 0 swings as shown in FIG. 21, to deflect second spring 41 to be energized. In this condition, when the chain starts to travel so as to remove the greater resistance from the movable member, the stored energy in second spring 41 similarly shifts linkage members 5 and 6 to cause movable member 9 to be backwardly moved to the position shown in FIG. 18.

In addition, in the case that movable member 9 is movable forward and backward by means of the stored energy in first and second springs 13 and 41, the reciprocation is controllable to be located at the preset speed changing stage, thereby properly shifting the chain and exactly maintaining it in the shifted position.

Other than the aforesaid embodiments, control members 12 and 40, as shown in FIG. 23, may be mounted to fitting member 1 through the pin 3 by which linkage member 5 is mounted to the latter or through pin 4 by which the mounting is not shown, and be mounted, as shown in FIG. 24, to one of linkage members 5 and 6 through a separate pin 50.

Furthermore, it is applicable that only first control member 12 is mounted to one of linkage members 5 and 6 and second one 40, as shown in FIG. 24, is mounted to fitting member 1 or the movable member 9 by which the mounting is not shown in the drawing, in which both control members 12 and 40 differ in their lines of movements, but each of recesses 21 is formed in a slot so as to be easily engageable with retainer 23.

Also, the construction in FIG. 24 has both springs 13 and 41 located inside linkage members 5 and 6 respectively, so that the derailleur may have a good appearance and be less damaged by external force.

In FIGS. 18 through 21 the reference numeral 43 designates a bolt for positionally adjusting second control member 40. Bolt 43 serves to adjust the relative position between each of recesses 21 and the ball 23c of retainer 23, of positioning device 20 in such a manner that chain guide pulleys 11a are, when the ball 23c is engaged with one of the recesses 21, are properly coincident with one of the sprockets of the multistage freewheel.

As clearly understood from the aforesaid description, the positioning device, even if a surplus extension is produced in the control wire always can, carry out proper shifting of the chain for changing the bicycle speed and also keep the movable member in the shifted position corresponding to the desired speed changing stage.

Furthermore, the derailleur of the invention is operable to change the bicycle speed without regard to whether or not the bicycle is running. In other words, even when the driving chain is at rest, and it is desired to shift to a preselected speed changing stage, i.e., shiftable under the so-called preselection the shift will take place, after the chain starts to travel.

The speed changing is also always accurate and the shifted position corresponding to the desired stage is properly maintained.

As many apparently widely different embodiments of this invention may be made without departing from the spirit and scope thereof, it is to be understood that the invention is not limited to the specific embodiment thereof except as defined in the appended claims.

What is claimed is:

1. A derailleur for a bicycle, which is adapted to shift a driving chain to one of two or more sprockets by operating a control wire to thereby change the bicycle speed, comprising:

(a) three members including a first fitting member, a second connecting member pivoted to said first fitting member, and a third movable member pivotably supported to said connecting member and provided with a chain guide means, said connecting member being swingable with respect to said fitting member, said movable member being swingable with respect to said connecting member and movable back and forth co-axially of said sprockets with respect to said fitting member, (b) at least one control member, said control member being swingably independently from said third movable member and having secured thereto either said control wire or an outer cable guiding said control wire, (c) a spring between said control member and said connecting member, said spring transmitting a force from said control member to said movable member when said control member is moved by said control wire or cable, said spring when energized energizing said movable member to shift axially in one direction when said control member swings independently of said movable member, the strength of said spring being greater than the force needed to shift the movable member under normal pedaling conditions of the bicycle, and (d) a positioning means provided between said control member and one of said three members and serving to positionally set said chain guide means, said positioning means comprising a holder provided on one of said control member and one of said three members, said holder having a plurality of set positions; and a retainer provided on either of said control member or one of said three members not carrying said holder and being engageable with any one of said set positions, means biasing the retainer to the holder with a force greater than that of the spring so that when energy stored in the spring is later released by the connecting member swinging to abut the control member, the retainer will stay in engagement with the holder.

2. The derailleur as set forth in claim 1, wherein said control member is pivotally attached to said fitting member.

3. The derailleur as set forth in claim 1, wherein said control member is pivotally attached to said movable member.

4. The derailleur as set forth in claim 1, wherein said control member is pivotally attached to said connecting member.

5. The derailleur as set forth in claim 1, wherein said control member is reciprocally movable to correspondingly reciprocally shift said movable member and is provided with said spring independent of said control member which stores energy by independent movement of said control member from said movable member, said spring when energized energizing said movable member in forward and backward shifting directions.

6. The derailleur as set forth in claim 1, wherein said control member is unidirectionally movable corresponding to a forward and backward shift of the movable member and is provided with said spring which stores energy by independent movement of said control member from said movable member, said spring when energized energizing said movable member.

7. The derailleur as set forth in claim 1, wherein said control member holding said control wire operable to shift said movable member employs a push-pull type wire capable of being pushed or pulled.

8. The derailleur as set forth in claim 1, wherein said control members hold two control wires used for shifting said movable member, one of said two control wires being pulled to make said movable member forward shiftable, the other of said two control wires being pulled to make the same backward shiftable.

9. The derailleur as set forth in claim 1, wherein said holder of the positioning means is provided on one of said control member and fitting member, and said retainer is provided at the other.

10. The derailleur as set forth in claim 1, wherein said holder of the positioning means is provided on one of said control member and movable member, and said retainer is provided at the other.

11. The derailleur as set forth in claim 1, wherein said holder of the positioning means is provided on one of said control member and connecting member, and said retainer is provided at the other.

12. The derailleur as set forth in claim 1, wherein said positioning means comprises said holder having a plurality of recesses and retainer selectively engageable with one of said recesses.

13. The derailleur as set forth in claim 12, wherein said retainer comprises a ball and a spring urging said ball toward said holder side, said spring allowing said ball to be engaged with each of said recesses by means of a greater force than that for energizing said spring, so that said retainer may be positionally kept in the engagement by overcoming the energized spring.

14. The derailleur as set forth in claim 12, wherein said holder is provided on one of said three members and said retainer is provided on said control member.

15. The derailleur as set forth in claim 12, wherein said holder is provided on said control member and said retainer is provided on one of said three members.

16. The derailleur as set forth in claim 1, wherein said connecting member comprises two parallel links, each of said links being pivoted at one end to said fitting member and at the other end side to said movable member through pins respectively.

17. A derailleur for a bicycle, which is adapted to shift a driving chain to one of two or more sprockets by operating a control wire to thereby change the bicycle speed, comprising;
(a) three members including a first fitting member, a second connecting member pivoted to said fitting member, and a third movable member pivotally supported to said connecting member and provided with a chain guide means, said connecting member being swingable with respect to said fitting member, said movable member being shiftable with respect to said connecting member and being movable back and forth co-axially of said sprockets with respect to said fitting member,
(b) a first and a second control member, said two control members being swingable independently from said third movable member respectively, said first control member holdable at one end thereof one of said control wire and an outer cable guiding said control wire, said second control member holding the other,
(c) a first and a second spring, which are provided on said first and second control members correspondingly thereto respectively, said two springs transmitting a force from said first and second control members to said movable member when said control members are moved by said control wires, said two springs when energized energizing said movable member to shift in one direction thereof when said first and second members swing independently with respect to said movable member, the strength of said springs being greater than the force needed to shift the movable member under normal pedaling conditions of the bicycle, and
(d) a positioning means provided between said first and second control members and serving to positionally set said chain guide means, said positioning means comprising a holder having a plurality of set positions and a retainer engageable with any one of said set positions, said holder being provided on one of said first and second control members, said retainer being provided on the other, means biassing the retainer to the holder with a force greater than that of the springs so that when energy stored in the springs is later released, the retainer will stay in engagement with the holder.

18. The derailleur as set forth in claim 17, wherein said first and second control members are pivotally attached to said fitting member so as to be co-axially swingable.

19. The derailleur as set forth in claim 17, wherein said first and second control members are pivotally attached to said movable member so as to be co-axially swingable.

20. The derailleur as set forth in claim 17, wherein said first and second control members are pivotally attached to said connecting member so as to be co-axially swingable.

21. The derailleur as set forth in claim 17, wherein said first and second control members are made to be swingable respectively around points displaced from each other.

22. The derailleur as set forth in claim 17, wherein said control wire for shifting said movable member employs a push-pull type wire capable of being pushed or pulled, one end of said control wire being secured to one of said first and second control members, and one end of said outer cable being secured to the other.

23. The derailleur as set forth in claim 17, wherein two control wires are used for shifting said movable member, one of which is secured to said first control member and the other to said second control member so that said one wire may be pulled to forwardly move said movable member and said other wire may be pulled to backwardly move the same.

24. The derailleur as set forth in claim 17, wherein said positioning means comprises said holder having a plurality of recesses and said retainer selectively engageable with one of said recesses.

25. The derailleur as set forth in claim 17, wherein said connecting member comprises two parallel links, one end of each of said links being pivotally attached to said fitting member and the other end being pivotally attached to said movable member through pins respectively.

* * * * *